Oct. 20, 1953 L. B. EATON 2,655,979
CONTAINER FORMING APPARATUS
Filed March 30, 1950 6 Sheets-Sheet 3

INVENTOR.
Lewis B. Eaton
BY J. Stanley Churchill
ATTORNEY

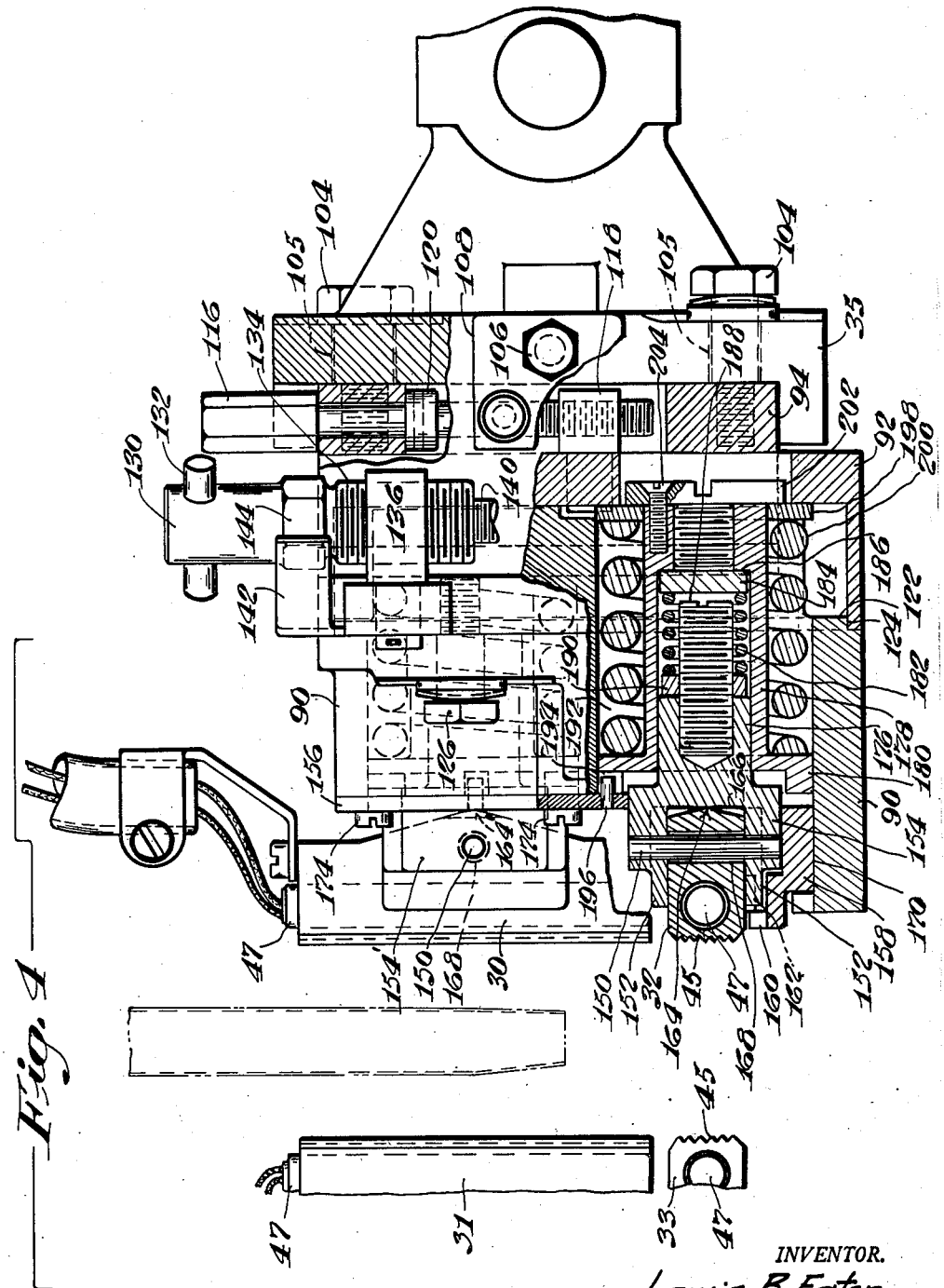

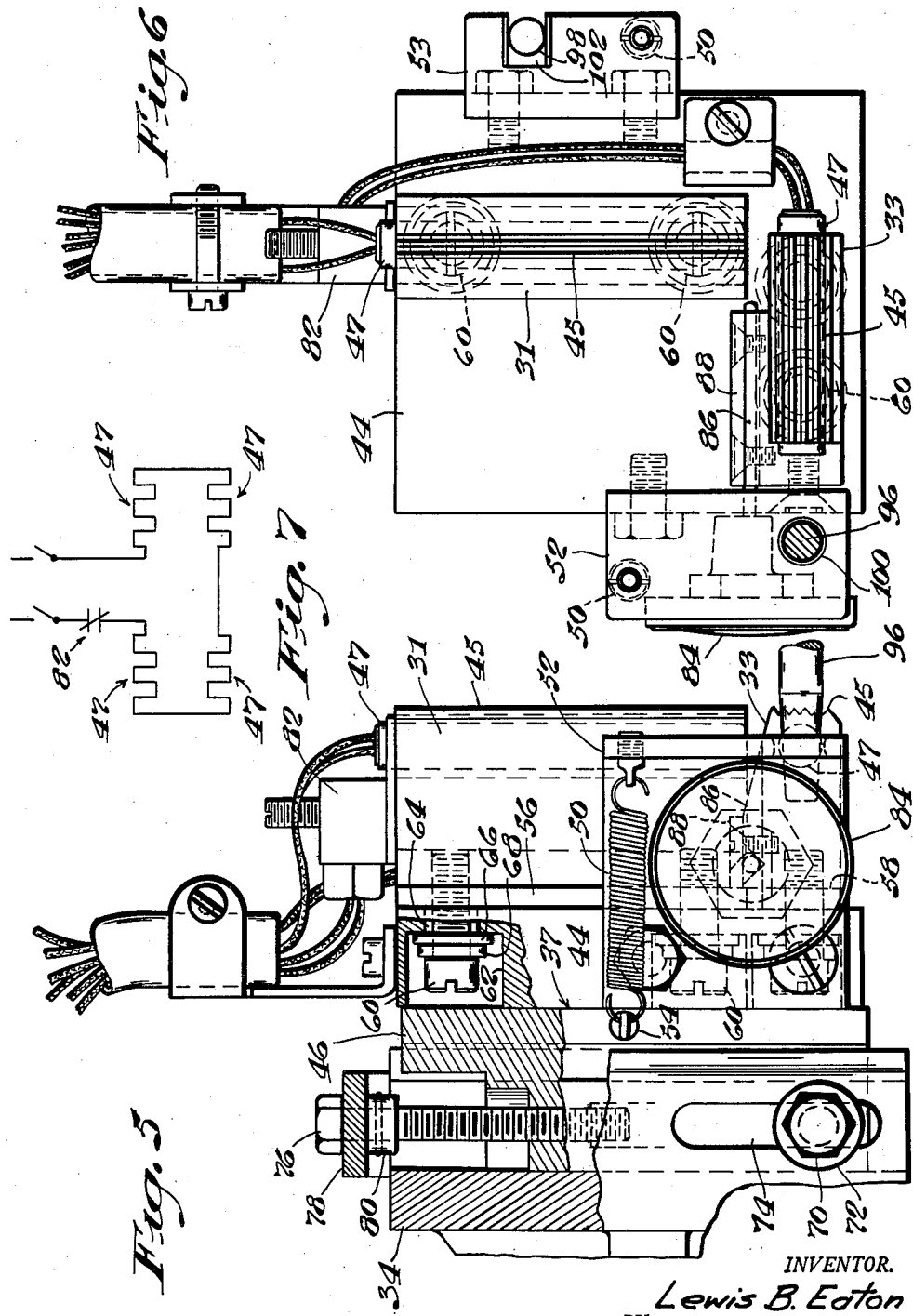

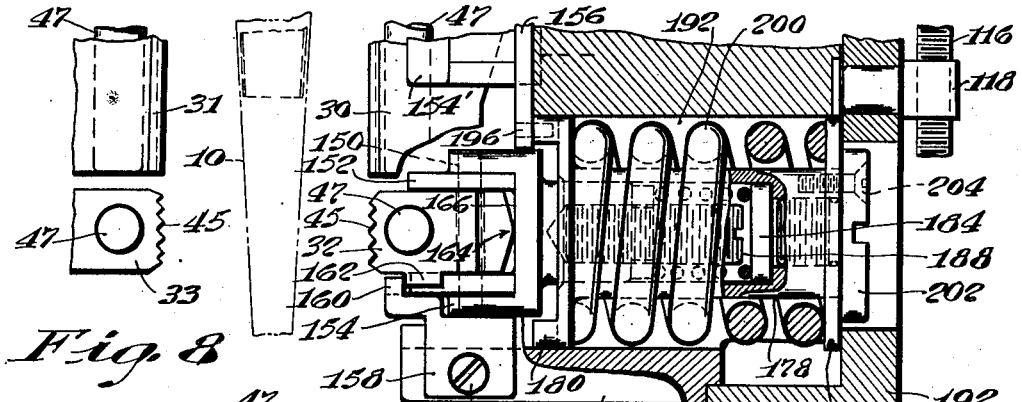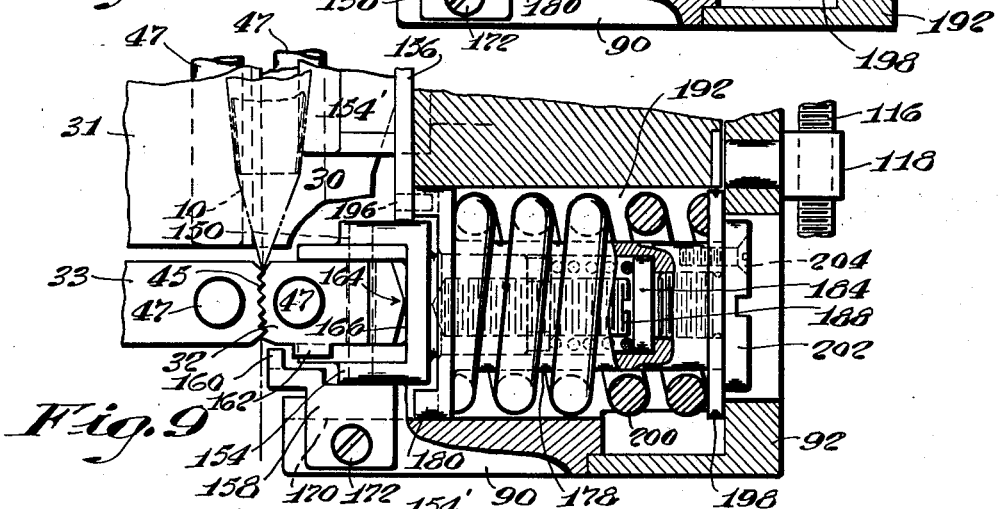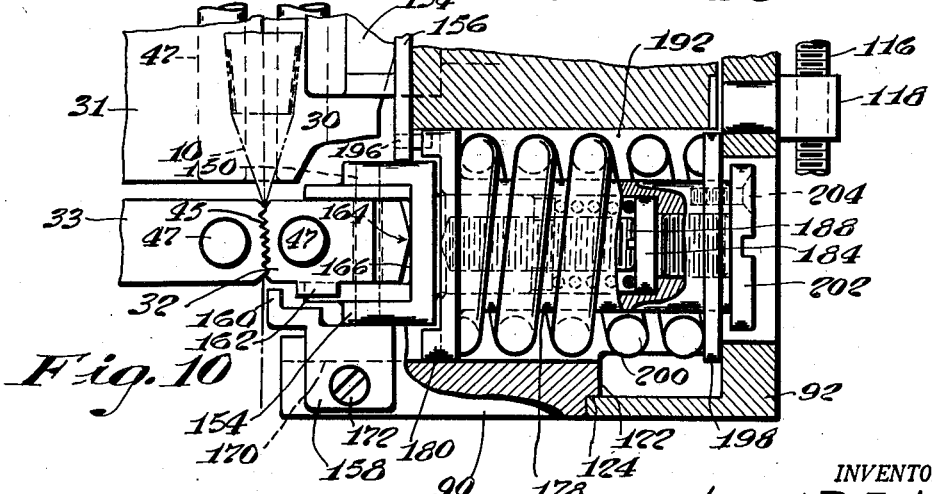

Patented Oct. 20, 1953

2,655,979

UNITED STATES PATENT OFFICE 2,655,979

CONTAINER FORMING APPARATUS

Lewis B. Eaton, Quincy, Mass., assignor to Pneumatic Scale Corporation, Limited, Quincy, Mass., a corporation of Massachusetts Application March 30, 1950, Serial No. 152,964

18 Claims. (Cl. 154—42)

1

This invention relates to a method of and apparatus for producing filled bags.

The invention has for an object to provide a novel and improved method of and apparatus for producing filled bags in an efficient, economical and rapid manner.

Another object of the invention is to provide the bag making machine with novel and highly efficient sealing instrumentalities by which superior bags may be produced, particularly when paper or other bag forming material is used in the machine.

With these general objects in view, and such others as may hereinafter appear, the invention consists in the method of and machine for producing filled bags and in the various structures, arrangements and combinations of parts hereinafter described and particularly defined in the claims at the end of this specification.

Figure 1:
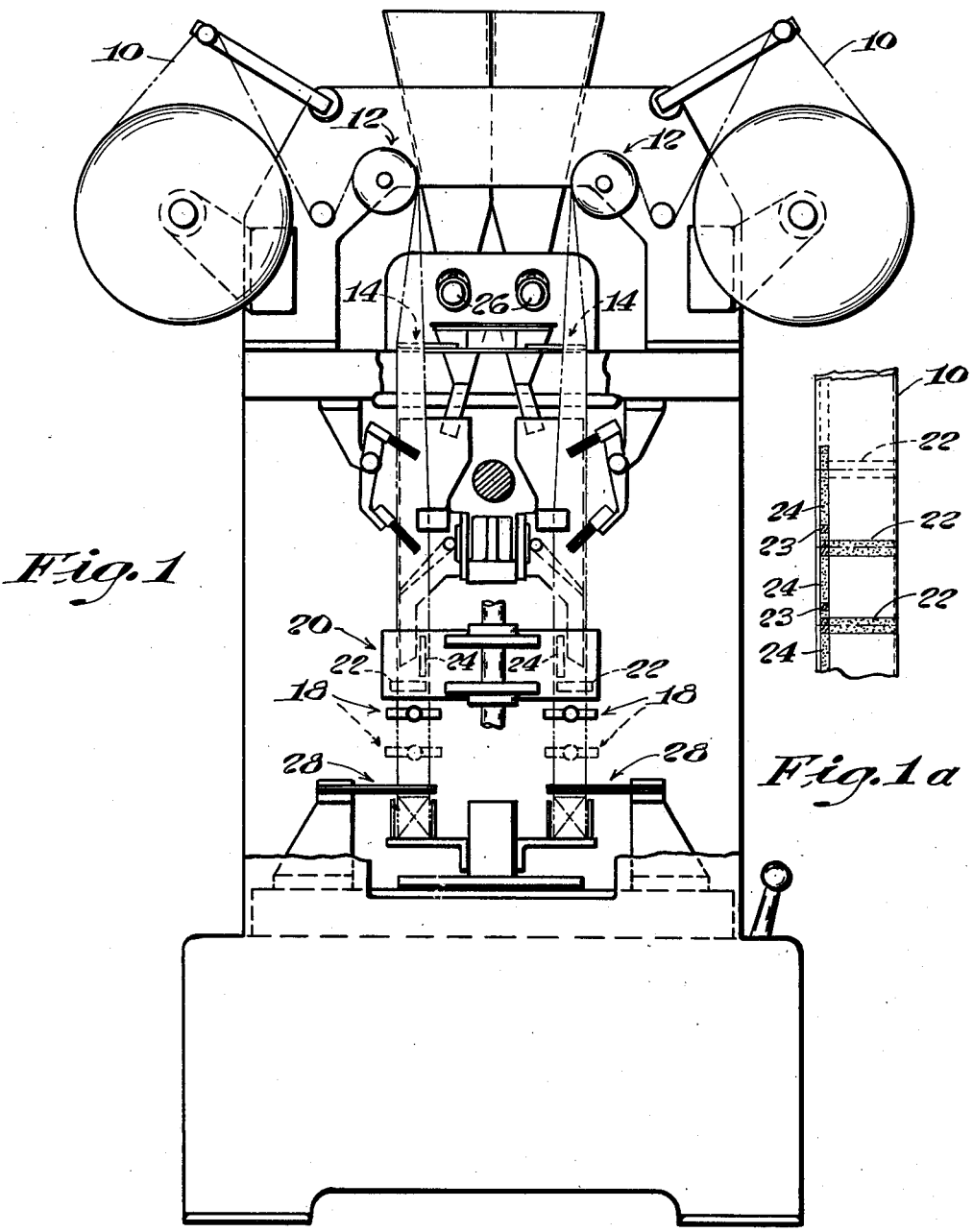
Figure 2:
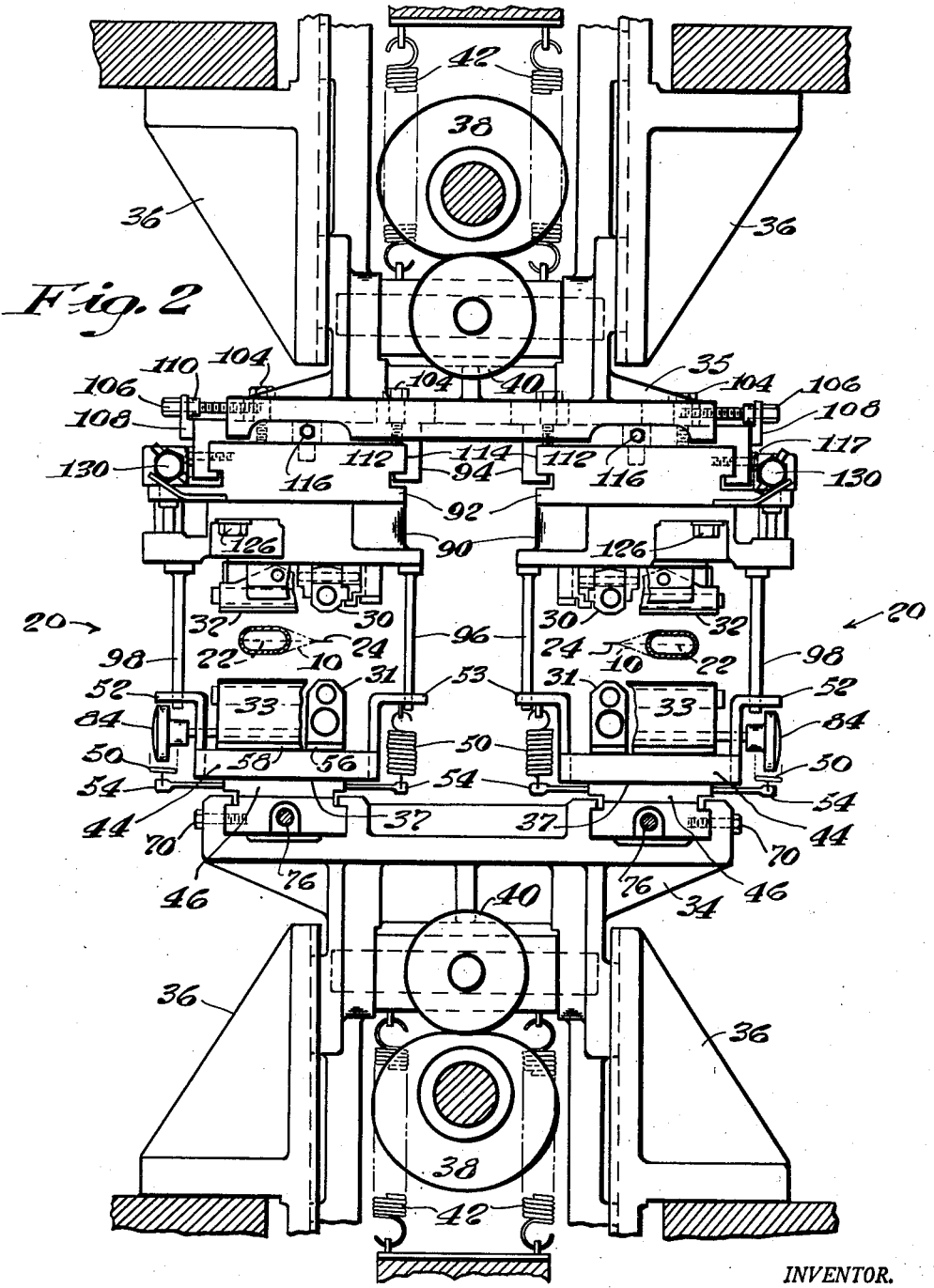
Figure 3:
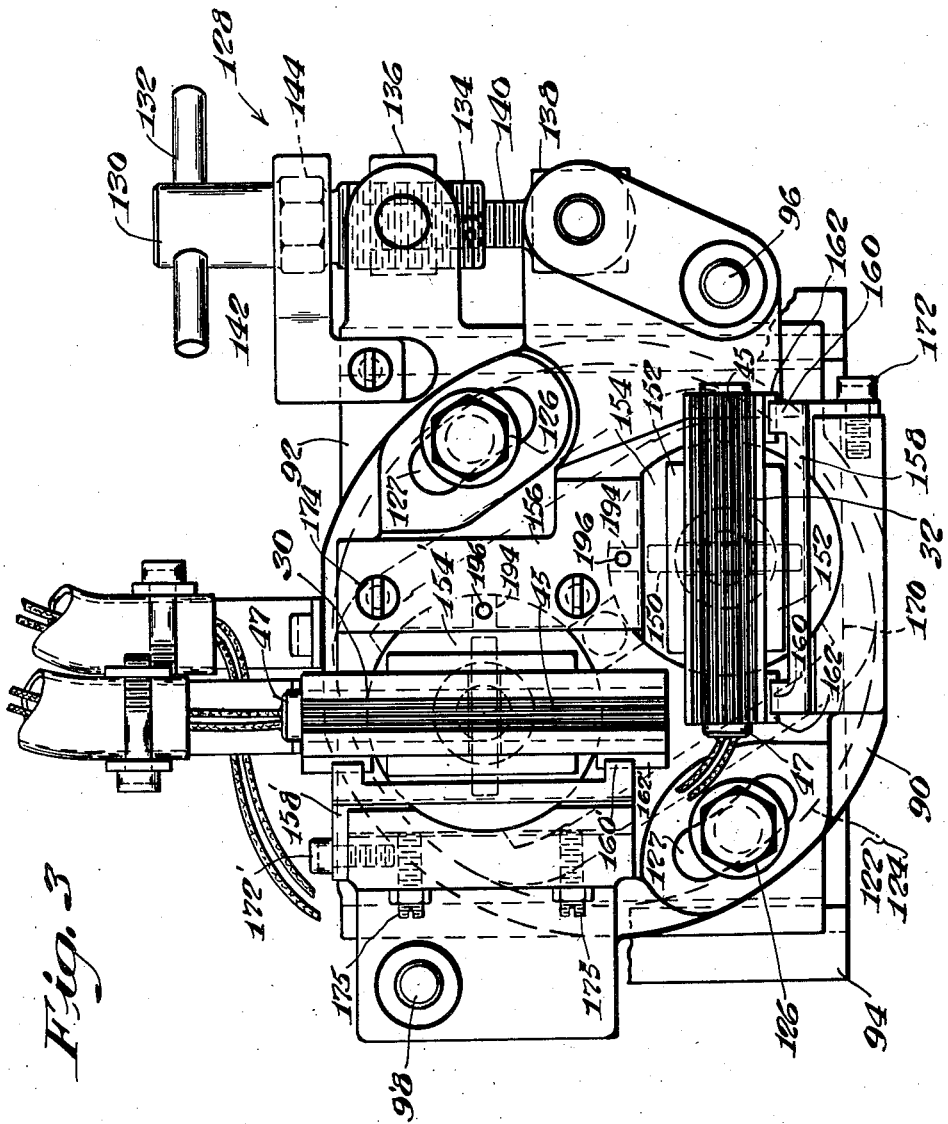

In the drawings illustrating the preferred embodiment of the invention, Fig. 1 is a front elevation of a duplex type of machine for forming, filling and sealing the bags; Fig. 1a is a detail view of a portion of a strip of bag forming material indicating successively sealed areas for forming a strip of connected bags; Fig. 2 is a plan view of the heat sealing mechanism; Figs. 3 and 4 are front and side elevations respectively of one of the cooperating heat sealing units shown in Fig. 2, some of the parts being broken away and shown in cross section; Figs. 5 and 6 are similar views in side and front elevations respectively of an opposed heat sealing unit adapted for cooperation with the sealing unit shown in Figs. 3 and 4; Fig. 7 is a wiring diagram for the heating units employed in the present heat sealing mechanism; and Figs. 8, 9 and 10 are cross sectional views of one of the heat sealing units shown in different positions of operation.

In general the present invention contemplates the provision of a bag making machine of the type wherein a strip of the bag forming material is folded about a longitudinal medial line and then successively sealed along spaced transverse and longitudinal zones to form a series of connected bag sections. Provision is made for filling successive bag sections prior to the sealing of the top of each bag. Thereafter the filled bag sections are severed from one another to form the completed filled bags.

Bag making machines of the general type just described have been used in the production of tea bags, and the present invention seeks to provide a novel machine of this type wherein provision is made for sealing the transverse and longitudinal portions of successive bag sections in a novel manner and by novel and highly efficient mechanism in order to produce filled bags having more firmly sealed and stronger non-leakable sealed portions.

Referring now to the drawings, the invention is illustrated as embodied in a machine for producing paper tea bags of the general type of the machine illustrated and described in United States Patterson Patent No. 2,385,229, dated September 18, 1945. As shown in Fig. 1, the machine comprises a duplex machine for simultaneously producing two strips of connected and filled tea bags and for then severing the completed tea bags from each strip. In the operation of the illustrated machine a web of bag forming material 10 is withdrawn from a supply roll thereof by withdrawing mechanism indicated generally at 12 and advanced over bag forming mechanism 14 which operates to fold the web longitudinally along a medial line to bring together the two half sections of the web preparatory to forming a strip of connected bag sections. The bag forming material is preferably drawn over the bag forming mechanism 14 by gripping and advancing mechanism 18 operative to intermittently advance the strip one bag length each cycle of operation from the full line to the dotted line, position shown in Fig. 1, and to present the strip in operative relation to the bag sealing mechanism, indicated generally at 20, arranged to seal the strip along a transverse zone 22 and a longitudinal zone 24 during each sealing operation to form a series of connected bag sections. Provision is also made for depositing successive charges of the commodity such as tea into successive of the uppermost bag sections, as they are being formed, by tea feeding mechanism indicated generally at 26, the feeding mechanism operating in timed relation to the operation of the strip advancing and heat sealing mechanisms 18, 20 respectively, and in the operation of the machine, the open top of a bag which has been provided with a charge of the commodity during one cycle of operation is closed and sealed during a succeeding cycle. Thereupon, the strip is intermittently advanced to bag severing mechanism, indicated generally at 28, which operates to sever the strip through successive transverse sealed portions to form individual filled and sealed bags.

Referring now to Fig. 2, the present heat sealing mechanism comprises duplex units 20, arranged for simultaneous operation upon two strips of bag forming material, and, as herein shown, each unit includes a set of two individual sealing elements 30, 32 arranged to cooperate with an opposing set of two individual sealing elements 31, 33. Each set is mounted for horizontal reciprocation into and from engagement with the intermittently advanced bag forming strip to press and heat seal successive transverse portions 22 and adjacent longitudinal marginal portions 24 of the strip thus forming a series of connected bag sections.

The duplex units 20 are carried by opposed horizontally reciprocal brackets 34, 35 slidably mounted in guide brackets 36 attached to the machine frame, and, each bracket 34, 35 is arranged to be reciprocated by a similar cam 38 arranged to cooperate with a roller 40 carried by the slide bracket in a manner similar to that shown in Patent No. 2,385,229 above referred to. Each slide bracket 34, 35 is arranged to be retracted by springs 42 which hold the roller 40 against its cam.

As herein illustrated, all of the individual sealing members 30, 31, 32, 33 may and preferably will be made of metal having longitudinally serrated engaging faces 45 arranged to fit the serrations in their opposing sealing members to form a crimped seal, and, each sealing member may be provided with its individual electric heating element, as indicated at 47. As shown in Figs. 5 and 6, the set of sealing members 31, 33 comprising the longitudinally and horizontally arranged sealing members respectively of one sealing unit, are individually secured to a laterally movable aligning plate 44 which is yieldingly and slidably retained against a supporting block or backing member 46 mounted for vertical adjustment in the bracket 34. The plate 44 is held flat against the face 37 of the supporting block 46 by springs 50 connected between angle brackets 52, 53 attached to opposed sides of the plate 44 and spring studs 54 extended from the block 46 so that in operation, the plate 44 is free to be shifted in any direction in a plane substantially parallel to the face of the cooperating sealing unit or in a plane substantially at right angles to the line of reciprocation whereby to permit the set of sealing members 31, 33 to align themselves with the cooperating set 30, 32 during the sealing operation. Insulating plates 56, 58 may be interposed between the aligning plate 44 and the sealing members 31, 33 respectively in order to reduce heat transfer from the sealing members to the plate 44, and, the sealing members may be secured to the plate by bolts 60 which extend through counterbored openings 62 in the rear face of the plate and through clearance openings 64 in the plate to permit initial lateral adjustment of the members 31, 33 on the plate. The bolts 60 may also be provided with insulating washers 66 and cooperating metal washers 68 as shown. The supporting block or backing member 46 is adjustably secured to the bracket 34 by a bolt 70 having a washer 72 and operating in a slotted opening 74 formed in the bracket 34, and, in order to facilitate vertical adjustment of the block 46 in the bracket, an adjusting screw 76 is arranged to cooperate with a threaded opening in the upper end of the block. The screw 76 may be supported in a bridge plate 78 attached to the bracket and is prevented from axial movement by a collar 80 pinned to the bolt on the underside of the bridge plate as shown, so that in operation when the bolt 70 is loosened, rotation of the adjusting screw 76 will effect raising or lowering of the block in the bracket whereupon the bolt 70 may be tightened to retain the block in its adjusted position. In practice, the heating element 47 in the sealing members 31, 32, 33, 34 may and preferably will be connected in series, as indicated in Fig. 7, and provided with a single control element comprising a thermostatic switch 82 extended into the vertically disposed sealing member 31 for controlling the temperature of the sealing members. A thermometer 84 may be suitably supported adjacent the heat sealing member 33 for convenience in reading the temperature of the sealing units. As herein shown, the stem of the thermometer may extend through the angle bracket 52 and into a V-groove formed in a block 86 engaging the sealing member 33 and a cover plate 88 is provided for retaining the stem in the groove.

Referring now to Figs. 3 and 4, the set of sealing members 30, 32 comprising the vertically disposed and the horizontally disposed sections respectively are individually mounted in a rotatably adjustable supporting member 90, each sealing member being mounted for slight tilting movement in its supporting member to permit conformity of the sections in parallel face to face relation with their opposing sections 31, 33 upon initial engagement of the sealing units during the sealing operation and to effect substantially uniform sealing pressure over the areas to be sealed, as will be described. The supporting member 90 is secured to and rotatably adjustable in a vertically adjustable supporting member 92 which in turn is secured to a horizontally adjustable supporting member 94 carried by the reciprocatory bracket 35 whereby to permit initial adjustment of the sealing unit vertically, horizontally and angularly to present the sealing members in substantial alignment with their opposing members and also to align the sealing members with relation to the web or strip of bag forming material to be sealed. The rotatably adjustable supporting member 90 is further provided with a pair of registration pins 96, 98 secured to diagonally opposed corners thereof, the forward ends of the registration pins being tapered and arranged to extend into suitable chambered openings 100, 102 formed in the angle brackets 52, 53 respectively, attached to the aligning plate 44 so that in operation when opposed sets of sealing members are moved toward each other during the sealing operation, the aligning plate 44 is caused to move laterally relative to the supporting block 46 and to effect accurate alignment and registration of the sealing sections 31, 33 with the opposed sections 30, 32. The opening 102 may comprise a slot as shown to prevent binding of the pins.

As herein illustrated the horizontally adjustable supporting member 94 is adjustably secured in a grooved portion 95 of the reciprocal bracket 35 by bolts 104 which extend through slots 105 in the bracket and in order to facilitate horizontal adjustment of the member 94 an adjusting screw 106 carried by an extension piece 108 attached to the outer end of the member 94 is arranged to cooperate with a threaded opening formed in the end of the bracket 35, as illustrated in Fig. 2. The adjusting screw 106 is provided with a collar 110 pinned thereto and arranged to bear against the inner face of the extension 108 to restrain the screw from axial movement relative to the extension during rotation of the screw. Thus, in operation, when the bolts 104 are loosened, rotation of the adjusting screw 106 will effect horizontal adjustment of the member 94, and the sealing unit secured thereto, in the bracket 35 whereupon the bolts 104 may be tightened to secure the parts in their adjusted position.

The vertically adjustable supporting member 92 is provided with a tongued portion 112 fitted into a vertically grooved portion 114 of the member 94 and is arranged to be adjusted vertically by an adjusting screw 116 carried by the member 94 and arranged to cooperate with a threaded portion of a swivel member 118 carried by and extending from the rear face of the member 92 as illustrated in Fig. 4. The adjusting screw 116 is restrained from axial movement in the member 94 by the provision of a collar 120 pinned thereto so that in operation rotation of the screw 116 will effect vertical adjustment of the member 92 and the sealing unit carried thereby. The member 92 may be secured in its adjusted position by bolts 117 extended through slots provided in the member 94.

From the description thus far it will be observed that the sealing unit 30, 32 may be initially adjusted vertically and horizontally with relation to the reciprocatory bracket 35 and the opposing sealing unit, and that the sealing unit 31, 33 may be brought into accurate alignment with the unit 30, 32 during the sealing operation by engagement of the registration pins 96, 98 with the openings in the angle members secured to the aligning plate 44.

Provision is further made in the preferred embodiment of the invention for initially angularly adjusting the sealing unit 30, 32 in order to align the vertically and horizontally arranged sealing units with relation to each other and the strip to be sealed. As illustrated in Figs. 3 and 4, angular adjustment of the unit 30, 32 may be accomplished by bodily rotating the supporting member 90 with relation to the vertically adjustable support 92, the member 90 being provided with a short annular extension 122 arranged to fit into a correspondingly shaped recessed portion 124 formed in the member 92. The members 90, 92 are adjustably secured together by bolts 126 extending through flanged portions of the members 90, 92, the member 90 being provided with arcuate slots 127 to permit rotary adjustment thereof.

The supporting member 90 and the parts carried thereby are arranged to be bodily rotated as a unit by adjusting means indicated generally at 128 extending between the members 90, 92, and as herein shown the connecting means 128 includes an adjusting screw 130 having a handle 132 and having an exteriorly threaded portion 134 cooperating with a swivel 136 carried by the vertically adjustable support 92. A pivotal connection 138, carried by the angularly adjustable member 90 is provided with a threaded portion 140 cooperating with an interiorly threaded portion of the adjusting screw 130. Thus, when it is desired to adjust the member 90, the bolts 126 are first loosened and upon rotation of the adjusting screw 130, the member 90 may be rocked in its support 92 to dispose the sealing unit 30, 32 in the desired angular position whereupon the bolts 126 may again be tightened. In order to hold the adjusting screw 130 in its adjusted position a spring arm 142 carried by the member 92 is arranged to engage an adjacent face of a hexagonal shoulder 144 formed on the adjusting screw, the spring arm 142 being capable of yielding to permit rotation of the screw during adjustment.

As illustrated in Figs. 3 and 4 the sealing members 30, 32 are individually floatingly or tiltingly mounted in the supporting member 90 in a manner such as to enable them to conform to the plane of their opposing sealing members 31, 33 in order to equalize the sealing pressure over the entire area of the individual members. As herein shown, each sealing member 30, 32 is similarly mounted, and, as best shown in Fig. 4 the sealing member 30 is pivotally mounted intermediate its ends on a pin 150 carried between the arms 152 of a holder 154. The holder 154 is yieldingly urged outwardly from the supporting member 90 and as herein shown the head of the holder is generally cylindrical in form having opposed parallel flattened portions arranged to cooperate with guide surfaces formed on detachable keeper plates 156, 158 respectively to maintain the sealing member 32 in a horizontal position, the unit being held from outward displacement by cooperating ears or lugs 160, 162 extending from the keeper plate 158 and the sealing member 32 respectively as shown.

In order to permit tilting or rocking of the sealing member 32 in its holder 154, the inner face of the sealing member 32 is angularly shaped terminating in a central bearing point 164 arranged to bear against the face 166 of the yieldingly pressed holder 154, and, the sealing member 32 is provided with a clearance opening 168 to permit the sealing member to be free of the pivot pin 150 during the sealing operation, the pin 150 merely serving as a retaining pin to prevent displacement of the sealing member from the holder. Thus, in operation when the sealing member 32 is yieldingly pressed against its opposing sealing member 33, at which time the sealing member 32 is depressed in its supporting member 90, the member 32 is free to rock or tilt longitudinally between the arms of the holder 154 to conform to the plane of the cooperating sealing member.

The lower guide member or keeper plate 158 may and preferably will be fitted into a grooved portion 170 of the supporting member 90, and is secured thereto by a screw 172, as shown in Figs. 3 and 8. The upper guide plate 156 is secured to the face of the supporting member 90 by screws 174 and is substantially L-shaped, the horizontal leg of the L forming the uper guide for the holder 154 and the vertical leg of the L providing a vertical guide surface for one side of a similar holder 154′ for the vertically disposed sealing member 30. The opposing guide member or keeper plate 158′ for the holder 154′ may also be mounted in a grooved portion of the supporting member 90 and adjustably secured thereto by a screw 172′ and is further provided with adjusting screws 175 carried by an extended portion of the supporting member 90 and arranged to engage the rear face of the guide member 158′ for initially adjusting the guide relative to the adjacent flattened portion of the head of the holder 154′ in order to assure alignment of the sealing member 30 in a vertical position. Similar cooperating lugs or ears 160′, 162′ are provided on the keeper 158′ and the sealing member 30 respectively in order to hold the yieldingly pressed unit from outward displacement in the supporting member 90.

Provision is made for mounting the holders 152, 152′ in a manner such as to provide a relatively slight yielding pressure during the initial period of engagement of the sealing members in order to permit rocking or tilting of the sealing members 30, 32 to enable them to conform to a plane parallel to the members 31, 33, as illustrated in Fig. 9, and thereafter a relatively greater yielding pressure is applied by the holders 152, 152' against the sealing members to produce the heat seals, as illustrated in Fig. 10. As best shown in Fig. 4, the holder 152 is provided with a stem portion 176 slidingly mounted in a tubular member 178 having a flanged portion 180 at its forward end, and the holder is yieldingly urged outwardly from the face of the supporting member 90 to present the sealing member 32 against the ear 160 of the keeper 158 by an initial compression spring 182 interposed between the holder 154 and a replaceable plug member 184 bearing against an interior shoulder 186 of the tubular member 178. The holder 154 is further provided with an adjustable screw 188 forming an extension thereof for cooperation with the plug 184 during the sealing operation, the outer end of the screw 188 being normally spaced from the plug, as shown in Figs. 4 and 8, and retained in its adjusted position by a lock nut 190.

The tubular member 178 is itself slidingly mounted in a chamber or bore 192 formed in the member 90, the flanged portion 180 fitting within the bore and bearing against the lower edge of the L-shaped guide plate 156 attached to the face of the supporting member 90. As herein shown, the outer face of the flange 180 is grooved to provide a clearance for the holder 154 during the sealing operation, and, one of the extended portions of the flange 180 forming a side wall of the grooved portion is itself provided with a groove 194 arranged to receive a pin 196 carried by and extending from the rear face of the guide plate 156 in order to prevent rotation of the tubular member in the chamber 192. The other end of the tubular member 178 is slidingly supported in a collar 198 bearing against a shouldered portion formed in the vertically adjustable member 92, and, a main compression spring 200 is interposed between the underside of the flange 180 and the collar 198. The closed end of the tubular member 178 is provided with a screw 202 having a large diameter head extending over the inner edge of the collar 198 to hold the parts in assembled relation. The screw 202 may be locked in operative relation with the tubular member 178 by a screw 204 extending through the head of the screw 202, as illustrated. It will be understood that the compression unit for the vertically disposed sealing member 30 may and preferably will be similarly mounted in the supporting member 90.

With the above-described construction it will be seen that during movement of the reciprocal units toward each other and prior to actual engagement of the sealing members 30, 32 and 31, 33 with the web to be sealed, the sealing members 30, 32 are extended into engagement with the keeper lugs 160, 160' and the adjustable extension screw 188 is spaced from the plug 184, as shown in Fig. 8, and that upon initial engagement of the cooperating sealing members, the initial compression spring 182 will yield moving the sealing members 30, 32 away from the keeper lugs 160', 160 respectively, thereby enabling the members 30, 32 to rock in the holders on their central bearing points 164', 164 and conform to the plane of the opposing sealing members 31, 33 respectively by virtue of the pivotal and yieldable mounting as shown in Fig. 9. Thereafter, upon continued movement of the opposed sealing units toward each other the end of the adjustable extension screw 188 will engage the plug 184, as shown in Fig. 10, and the slidingly mounted tubular member 178 will be retracted against the pressure of the main compression spring 200 to perform the sealing operation.

In practice the sealing pressure may be conveniently varied for the purpose of balancing the pressure of the similarly mounted units 30, 32 and to compensate for various types and thicknesses of heat sealable container forming material by effecting adjustment of each extension screw 188 cooperating with the plug 184 and by providing collars 198 of different thicknesses to increase or decrease the pressure of the main compression spring 200. The present construction of sealing mechanism is further designed to be easily and quickly disassembled to permit adjustment or replacement of parts, and, as herein shown, the sealing member 32 and its holder 154 may be easily removed as a unit by merely removing one screw 172, and sliding the keeper 158 out of its groove. The compression spring unit may be likewise easily removed by merely detaching the L-shaped guide plate 156 to permit withdrawal of the unit from the supporting member 90. The L-shaped guide plate 156, engageable with one side of both the horizontal and the vertical holders 154, 154' assures accurate positioning of the sealing members 32, 30 relative to each other, and, the cooperating guide members or keeper plates 158' 158 assures maintenance of the members 32, 30 in their horizontal and vertical positions of alignment during the sealing operation.

From the above description it will be observed that provision is made in the present heat sealing apparatus for simultaneously sealing two areas of the container forming material at right angles to each other, wherein successive sealing operations produce a series of completely sealed and connected bag sections and wherein the sealing members are individually mounted and capable of cooperation with their opposing sealing members in a manner such as to independently effect equalization of the sealing pressure in their respective areas thereby avoiding the difficulties formerly encountered when a continuous L-shaped sealing member is employed. As illustrated in Fig. 1a, the sealing member for producing each longitudinal seal 24 may be elongated beyond the length of one bag section so as to produce overlapping sealed portions indicated by cross hatching 23 to form a continuous longitudinal seal. It will also be observed that provision is made for adjusting the sealing mechanism with relation to its supporting elements and the strip or web to be sealed either vertically, horizontally or angularly and that accurate registration of opposing sealing members is assured by mounting one set of sealing members 31, 33 to be capable of shifting relative to its supporting block and by the provision of registration pins carried by the other sealing unit for cooperation with openings in the first sealing unit to effect such shifting and registration.

While the preferred embodiment of the invention has been herein illustrated and described, it will be understood that the invention may be embodied in other forms within the scope of the following claims.

Having thus described the invention, what is claimed is:

1. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, means for bodily moving the cooperating sealing members into and out of operative engagement with the strip during the idle periods of the intermittently advanced web to perform successive sealing operations, the cooperating members for sealing the longitudinal area being elongated beyond the length of one bag section so that successive sealing operations form overlapping sealed portions along the longitudinal area to form a series of completely sealed and connected bag sections.

2. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, means for bodily moving the cooperating sealing members into and out of operative engagement with the strip during the idle periods of the intermittently advanced web to perform successive sealing operations, the cooperating members for sealing the longitudinal area being elongated beyond the length of one bag section so that successive sealing operations form overlapping sealed portions along the longitudinal area to form a series of completely sealed and connected bag sections, the sealing members of one set being individually yieldingly mounted for independent rocking movement to be capable of conforming to the plane of their respective cooperating sealing members upon initial engagement therewith whereby to enable the sealing operation to be performed with uniform sealing pressure over the different areas to be sealed.

3. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, means for bodily moving the cooperating sealing members into and out of operative engagement with the strip during the idle periods of the intermittently advanced web to perform successive sealing operations, the cooperating members for sealing the longitudinal area being elongated beyond the length of one bag section so that successive sealing operations form overlapping sealed portions along the longitudinal area to form a series of completely sealed and connected bag sections, the sealing members of one set being individually yieldingly mounted for independent rocking movement to be capable of conforming to the plane of their respective cooperating sealing members upon initial engagement therewith whereby to enable the sealing operation to be performed with uniform sealing pressure over the different areas to be sealed, the sealing members of the cooperating set being mounted for shifting movement in a plane substantially parallel to said one set, and means carried by said one set for engagement with the cooperating set to cause the latter to be shifted into alignment with said one set during the sealing operation.

4. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, means for bodily moving the cooperating sealing members into and out of operative engagement with the strip during the idle periods of the intermittently advanced web to perform successive sealing operations, the cooperating members for sealing the longitudinal area being elongated beyond the length of one bag section so that successive sealing operations form overlapping sealed portions along the longitudinal area to form a series of completely sealed and connected bag sections, all of said sealing members comprising metal, and each sealing member having an individual heating element, and a thermostat connected in series with said heating elements to control the temperature of the sealing members.

5. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, means for bodily moving the cooperating sealing members into and out of operative engagement with the strip during the idle periods of the intermittently advanced web to perform successive sealing operations, the cooperating members for sealing the longitudinal area being elongated beyond the length of one bag section so that successive sealing operations form overlapping sealed portions along the longitudinal area to form a series of completely sealed and connected bag sections, the sealing members of one set being mounted for shifting movement in a plane substantially parallel to the cooperating set, and means carried by the latter for engagement with said one set to cause the same to be shifted into alignment with said cooperating set during the sealing operation.

6. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for individually mounting the sealing members of one set to be capable of independently rocking to conform to the plane of the cooperating set of sealing members upon initial engagement therewith whereby to enable the sealing operation to be performed with uniform sealing pressure over the different areas to be sealed.

7. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed.

8. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, and means carried by said supporting member for guiding said holders in a predetermined spaced and angular position with respect to each other while permitting said independent rocking movement.

9. In a container forming machine, heat sealing mechanism comprising a pair of cooperating sets of heat sealing members, means for bodily moving the cooperating sealing members into and out of operative engagement with the material to be sealed, each set including two elongated sealing members arranged substantially at right angles to each other for simultaneously sealing two different areas of the container forming material, and means for supporting one set of sealing members to be capable of independent rocking to conform to the plane of the cooperating set of sealing members upon initial engagement therewith including a supporting member, a holder for each sealing member of said one set individually and yieldingly mounted in said supporting member, each sealing member of said one set being formed to provide a central bearing point forming a pivot engageable with its respective yieldingly mounted holder whereby to enable the sealing operation to be performed with uniform sealing pressure over the different areas to be sealed.

10. In a container forming machine, heat sealing mechanism comprising a pair of cooperating sets of heat sealing members, means for bodily moving the cooperating sealing members into and out of operative engagement with the material to be sealed, each set including two elongated sealing members arranged substantially at right angles to each other for simultaneously sealing two different areas of the container forming material, and means for supporting one set of sealing members to be capable of independent rocking to conform to the plane of the cooperating set of sealing members upon initial engagement therewith including a supporting member, a holder for each sealing member of said one set individually and yieldingly mounted in said supporting member, each sealing member of said one set being formed to provide a central bearing point forming a pivot engageable with its respective yieldingly mounted holder whereby to enable the sealing operation to be performed with uniform sealing pressure over the different areas to be sealed, and means carried by said supporting member for guiding and maintaining the holders in said predetermined angular positions while permitting rocking movement of the elongated sealing members in said holders and about said central bearing points whereby to balance the sealing pressure on each side of the pivots.

11. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, the yieldable mounting for each of said holders including a relatively low compression spring effective during initial engagement of opposed sealing members to permit said conforming movement, and a relatively high compression spring effective after said conforming movement to apply the sealing pressure.

12. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, the yieldable mounting for each of said holders including a relatively low compression spring effective during initial engagement of opposed sealing members to permit said conforming movement, and a relatively high compression spring effective after said conforming movement to apply the sealing pressure, and adjustable means for varying the time between the conforming and the sealing pressure periods.

13. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, the yieldable mounting for each of said holders including a relatively low compression spring effective during initial engagement of opposed sealing members to permit said conforming movement, and a relatively high compression spring effective after said conforming movement to apply the sealing pressure, and stop means carried by said supporting member for limiting outward displacement of said holders and their sealing members.

14. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, the cooperating set of sealing members being mounted for shifting movement in a plane substantially parallel to said one set, and means carried by said one set for engagement with the cooperating set to cause the latter to be shifted into alignment with said one set during the sealing operation.

15. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, and means for mounting said supporting member for rotary adjustment to permit said one set of sealing members to be adjusted angularly with respect to said mounting to effect preliminary approximate alignment thereof with respect to the cooperating set of sealing members.

16. In a container forming machine, heat sealing mechanism comprising a pair of cooperating sets of heat sealing members, means for bodily moving the cooperating sealing members into and out of operative engagement with the material to be sealed, each set including a plurality of sealing members arranged for simultaneously sealing a plurality of different areas, and means for supporting one set of sealing members to be capable of independently rocking to conform to the plane of the cooperating set of sealing members upon initial engagement therewith including a supporting member, each sealing member having a holder individually and yieldingly mounted in said supporting member and being formed to provide a central bearing point forming a pivot engageable with its respective yieldingly mounted holder whereby to enable the sealing operation to be performed with uniform sealing pressure over the different areas to be sealed, and means for mounting said supporting member for rotary adjustment to permit said one set of sealing members to be adjusted angularly with respect to said mounting to effect preliminary approximate alignment thereof with respect to the cooperating set of sealing members, said rotary adjustment mounting being itself mounted for horizontal and vertical adjustment.

17. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, the cooperating members for sealing the longitudinal area being elongated beyond the length of one bag section so that successive sealing operations form overlapping sealed portions along the longitudinal area to form a series of completely sealed and connected bag sections, the sealing members of one set being mounted for shifting movement in a plane substantially parallel to the cooperating set, and means carried by the latter for engagement with said one set to cause the same to be shifted into alignment with said cooperating set during the sealing operation, and means for supporting said one set of sealing members including a backing member, a slide plate upon which said one set of sealing members are individually and adjustably mounted, and a pair of springs for retaining the slide plate in engagement with the backing member to permit said shifting movement.

18. In a container forming machine having means for supporting and intermittently advancing a strip of folded bag forming material one bag section each cycle of operation, the improvement comprising heat sealing mechanism comprising a pair of cooperating sets of sealing members arranged to simultaneously heat seal two different areas of the strip comprising a longitudinal area and a transverse area spaced from the longitudinal area, the cooperating members for sealing the longitudinal area being elongated beyond the length of one bag section so that successive sealing operations form overlapping sealed portions along the longitudinal area to form a series of completely sealed and connected bag sections, the sealing members of one set being mounted for shifting movement in a plane substantially parallel to the cooperating set, and means carried by the latter for engagement with said one set to cause the same to be shifted into alignment with said cooperating set during the sealing operation, and means for supporting said one set of sealing members including a backing member, a slide plate upon which said one set of sealing members are individually and adjustably mounted, and a pair of springs for retaining the slide plate in engagement with the backing member to permit said shifting movement, and means for supporting said backing plate for vertical adjustment.

LEWIS B. EATON.

References Cited in the file of this patent

UNITED STATES PATENTS

| Number | Name | Date |
|---|---|---|
| 2,125,758 | Waters | Aug. 2, 1938 |
| 2,395,387 | Fry et al. | Feb. 26, 1946 |
| 2,414,157 | Marziani | Jan. 14, 1947 |
| 2,425,388 | Oestricher | Aug. 12, 1947 |
| 2,441,817 | Huff | May 18, 1948 |
| 2,444,685 | Waters | July 6, 1948 |
| 2,453,889 | Bojanower | Nov. 16, 1948 |
| 2,467,879 | Billeb | Apr. 19, 1949 |
| 2,474,035 | Crandon | June 21, 1949 |
| 2,525,139 | Ligon | Oct. 10, 1950 |